United States Patent
Kohlberger et al.

(10) Patent No.: US 10,991,993 B2
(45) Date of Patent: Apr. 27, 2021

(54) METHOD FOR OPERATING A BATTERY, AND BATTERY

(71) Applicant: Robert Bosch GmbH, Stuttgart (DE)

(72) Inventors: Markus Kohlberger, Stuttgart (DE); Alexander Reitzle, Neu-Ulm (DE); Mike Martinko, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 46 days.

(21) Appl. No.: 15/770,539

(22) PCT Filed: Oct. 27, 2016

(86) PCT No.: PCT/EP2016/075901
§ 371 (c)(1),
(2) Date: Apr. 24, 2018

(87) PCT Pub. No.: WO2017/076733
PCT Pub. Date: May 11, 2017

(65) Prior Publication Data
US 2019/0067757 A1    Feb. 28, 2019

(30) Foreign Application Priority Data
Nov. 6, 2015 (DE) .................... 10 2015 221 807.4

(51) Int. Cl.
H01M 10/48      (2006.01)
H01M 10/42      (2006.01)
H01M 10/633     (2014.01)

(52) U.S. Cl.
CPC ..... *H01M 10/482* (2013.01); *H01M 10/4207* (2013.01); *H01M 10/486* (2013.01); *H01M 10/633* (2015.04)

(58) Field of Classification Search
None
See application file for complete search history.

(56) References Cited

U.S. PATENT DOCUMENTS 6,573,685 B2    6/2003    Nakanishi et al.
2001/0035737 A1   11/2001   Nakanishi et al.
(Continued)

FOREIGN PATENT DOCUMENTS

DE            60112502       6/2006
DE       102010041024 A1    3/2012
(Continued)

OTHER PUBLICATIONS

Butzmann et al. (DE 102010041024) (a raw machine translation) (Abstract) (Mar. 22, 2012) (Year: 2012).*
(Continued)

*Primary Examiner* — Carmen V Lyles-Irving
(74) *Attorney, Agent, or Firm* — Michael Best & Friedrich LLP

(57) ABSTRACT

The invention relates to a method for operating a battery having at least one battery module (2) with at least one battery cell (3), having the following method steps: a. determining a first value of at least one first monitored variable of the at least one battery module (2) and/or the at least one battery cell (3), c. checking whether the determined first value of the at least one first monitored variable lies within a specified first target range for the at least one first monitored variable, the first target range being determined in particular in a method step b, and d. replacing the at least one battery module (3) with a different battery module and/or replacing the at least one battery cell (2) with a different battery cell if the determined first value of the at least one first monitored variable lies outside of the first target range for the at least one first monitored variable, wherein the first value of the at least one first monitored variable for the other battery module or the other battery cell lies within the first target range for the at least one first monitored variable.

8 Claims, 2 Drawing Sheets

(56) References Cited

U.S. PATENT DOCUMENTS

| | | | |
|---|---|---|---|
| 2010/0121511 A1 | 5/2010 | Onnerud et al. | |
| 2012/0116699 A1 | 5/2012 | Haag et al. | |
| 2012/0326665 A1 | 12/2012 | Yin et al. | |
| 2013/0030739 A1* | 1/2013 | Takahashi | G01R 31/392 |
| | | | 702/63 |

FOREIGN PATENT DOCUMENTS

| | | |
|---|---|---|
| DE | 102014209476 | 11/2015 |
| EP | 2557428 | 2/2013 |
| JP | 2007141464 A | 6/2007 |
| KR | 101338348 | 12/2013 |

OTHER PUBLICATIONS

Butzmann et al. (DE 102010041024) (a raw machine translation) (Detailed Description) (Mar. 22, 2012) (Year: 2012).*
International Search Report for Application No. PCT/EP2016/075901 dated Jan. 16, 2017 (English Translation, 2 pages).

\* cited by examiner

METHOD FOR OPERATING A BATTERY, AND BATTERY

BACKGROUND OF THE INVENTION

The invention relates to a method for operating a battery. A battery is also the subject matter of the present invention.

It is known from the prior art that batteries, such as in particular lithium-ion batteries, consist at least of a battery module or also advantageously of a plurality of battery modules. In addition, a battery module has preferably a plurality of individual battery cells, which are connected to one another to form the battery module, wherein the individual battery cells can be connected to one another in series or in parallel.

Battery cells, battery modules and/or batteries for an after-series supply of the battery can only be stored for a limited time and are checked at regular intervals by means of measurements of the electrical values. This entails costs for a temperature-controlled storage and for the measuring equipment. It is alternatively possible to reconstruct individual battery cells, battery modules and/or batteries for the after-series supply. This entails costs for facilities and parts.

From the prior art, it is, for example, known from the American patent applications US20100121511 and U.S. Pat. No. 6,573,685 how to replace defective battery cells of a battery module.

SUMMARY OF THE INVENTION

The method for operating a battery and the battery have the advantage that a monitoring of at least one monitored variable characterizing the performance and/or the ageing state of individual battery modules and/or individual battery cells is possible. Thus, individual battery modules and/or battery cells that no longer satisfy the performance requirements and/or have an advanced ageing state can be determined and be replaced by other individual battery modules and/or other individual battery cells. As a result, it is advantageously possible, to extend the service life of the entire battery at a higher level of performance.

According to the invention, a method for operating a battery is provided. The battery has at least one battery module which has at least one battery cell.

In a method step a, a first value of at least one first monitored variable of the at least one battery module and/or the at least one battery cell is determined.

In particular in a method step b, a first target range for the first value of the at least one first monitored variable can be determined. Alternatively, the first target range for the first value of the at least one first monitored variable can also already have been determined prior to carrying out the method step a.

Furthermore, the first target range for the first value of the at least one first monitored variable can alternatively be determined for each point in time during the operation of the battery already prior to operating the battery.

A check is then made in a method step c, whether the first value, which is determined in the method step a, of the at least one first monitored variable of the at least one battery module and/or the at least one battery cell lies within the first target range for the at least one first monitored variable of the at least one battery module and or of the at least one battery cell, said target range being determined in the method step b or in particular already prior to the method step a.

In a method step d, the at least one battery module is then replaced by another battery module and/or the at least one battery cell is replaced by another battery cell, if the check in the method step c indicates that the first value of the at least one first monitored variable, said first value being determined in the method step a, lies outside of the first target range for the at least one first monitored variable. Thus, the first value of the at least one first monitored variable for the other battery module or the other battery cell lies within the first target range for the at least one first monitored variable.

It is advantageous if the at least one first monitored variable is a temperature, an electrical voltage, a discharge current, a volume expansion, a capacity, a charge acceptance, which describes the relationship of the energy absorbed by the at least one battery module and/or the at least one battery cell during charging to the energy dissipated during charging, an efficiency or a self-discharge, which describes the loss of charge of the at least one battery module and/or the at least one battery cell within a defined time interval.

Particularly the temperature, the electrical voltage, the discharge current or the volume expansion of a battery cell characterize the performance thereof so that, if the first monitored variable is such a characteristic variable, a monitoring of the performance of the at least one battery module and/or the at least one battery cell is possible. Thus, the performance of the entire battery can be maintained by means of a replacement of the at least one battery module and/or the at least one battery cell, which no longer exhibit a sufficient performance, because particularly a first monitored variable characterizing the performance lies outside of the first target range.

Particularly the capacity, the charge acceptance, the efficiency or the self-discharge of a battery cell characterize the ageing state thereof so that, if the first monitored variable is such a characteristic variable, a monitoring of the ageing state of the at least one battery module and/or the at least one battery cell is possible. Thus, the service life of the entire battery can be extended by a replacement of the at least one battery module and/or the at least one battery cell which has a too advanced ageing state because particularly one first monitored variable characterizing the ageing state lies outside of the first target range.

In particular, it is, of course, also possible, to determine in each case a first value for at least two or also for several first monitored variables, which are preferably different from each other and to check whether the first value determined in each case lies within the first target range for the respective first monitored variable.

In particular, it is therefore also possible, to determine in each case first values of a plurality of first monitored variables that are different from one another and characterize performance and to check whether the first value determined in each case lies within the respective first target range for the first monitored variable determined in each case; thus enabling the performance to be monitored by a plurality of characteristic variables.

In particular, it is therefore also possible, to determine in each case first values of a plurality of first monitored variables that are different from one another and characterize the ageing state and to check whether the first value determined in each case lies within the respective first target range for the first monitored variable determined in each case; thus enabling the ageing state to be monitored by a plurality of characteristic variables.

In particular, the performance and the ageing state of individual battery modules and/or individual battery cells can thereby, for example, be simultaneously monitored in particular in each case by a plurality of characteristic variables.

At this point, it should be noted that, in the case of a plurality of first monitored variables, respectively one first target range is determined for each of the first monitored variables.

According to one aspect of the invention, the battery is equipped for mobile use and/or for stationary use. Hence, a battery equipped for mobile use can be used especially in hybrid, plug-in hybrid and electric vehicles as well as in E-bikes.

According to a further aspect of the invention, the other battery module and/or the other battery cell is equipped for stationary usage. Thus, another battery module and/or another battery cell can be used in a stationary application, in particular for safety-related equipment and for storage devices for wind power plants and/or solar plants. This has the advantage that battery modules and/or battery cells used as replacement parts can be stored stationary and in a cost neutral manner and used until these are needed as a replacement. In particular the ageing phenomena occurring during use as a stationary storage do not represent a problem because the battery modules and or battery cells to be replaced likewise age. Particularly the usage profile of the battery modules and/or battery cells that are equipped as stationary storage units is selected such that said usage profile corresponds at the most to an average load on the vehicle. This means that the power output of the other battery module or the other battery cell over the time is less than for the at least one battery module or the at least one battery cell. Overall the device of the other battery module and/or the battery cell has the advantage as a stationary storages that the costs are reduced for storing and checking thereof.

It is furthermore expedient if the method has the method steps e and f.

In the method step e, a second value of at least a second monitored variable of the other battery module and/or the other battery cell is determined.

In the method step f, the other battery module and/or the other battery cell is operated in such a way that the second value of the at least one second monitored value lies within a specified second target range. This has the advantage that the other battery module and/or the other battery cell can be operated in a defined manner so that a variable characterizing the performance and/or the ageing state of the other battery module and/or the other battery cell is known.

It is advantageous if the at least one second monitored variable is a temperature, an electrical voltage, a discharge current, a volume expansion, a capacity, a charge acceptance, which describes the relationship of the energy absorbed by the other battery module and/or the other battery cell during charging to the energy dissipated during charging, an efficiency or a self-discharge, which describes the loss of charge of the other battery module and/or the other battery cell within a defined time interval.

Because particularly the temperature, the electrical voltage, the discharge current or the volume expansion characterize the performance of a battery cell and thus the performance of the other battery module and/or the other battery cell, the performance of the other battery module and/or the other battery cell can be controlled in a defined manner using the method steps e and f over the service life of the battery. The second target range is preferably specified in such a way that the other battery module and/or the other battery cell fulfill the performance demands of the battery.

Because particularly the capacity, the charge acceptance, the efficiency or the self-discharge characterize the ageing state of a battery cell and thus the ageing state of the other battery module and/or the other battery cell, the ageing state of the other battery module and/or the other battery cell can be controlled in a defined manner using the method steps e and f over the service life of the battery. The second target range is preferably specified in such a way that the other battery module and/or the other battery cell have an ageing state that is advanced only so much that it can be used in the battery as a replacement.

In particular, it is also, of course, possible, to determine in each case a second value for at least two or also for a plurality of second monitored variables that are preferably different from one another and to specify in each case a second target range for each of the second monitored variables. In particular, it is also therefore possible, to determine a plurality of second monitored variables that are different from one another and characterize the performance and to specify in each case a second target range for each of the second monitored variables so that the performance can be controlled in a defined manner by a plurality of characteristic variables.

In particular, it is also therefore possible, to determine a plurality of second monitored variables that are different from one another and characterize the ageing state and to specify in each case a second target range for each of the second monitored variables so that the ageing state can be controlled in a defined manner by a plurality of characteristic variables.

In particular, the performance and the ageing state of individual battery modules and/or individual battery cells can thereby, for example, be simultaneously controlled in a defined manner particularly in each case by a plurality of characteristic variables.

In so doing, the at least one second monitored variable can preferably be different from the at least one first monitored variable.

In particular in a first case, if at least one first monitored variable monitors the performance of the at least one battery module or the at least one battery cell, at least one second monitored variable is selected for characterizing the ageing state of the other battery module and/or the other battery cell.

In particular in a second case, if at least one first monitored variable monitors the ageing state of the at least one battery module and/or the at least one battery cell, at least one second monitored variable is selected for characterizing the performance of the other battery module and/or the other battery cell.

In particular in a third case, the first monitored variable and the second monitored variable can characterize the performance; and in a fourth case, the first monitored variable and the second monitored variable can characterize the ageing state.

Of course, it is also preferably possible to monitor the performance and/or the ageing state of the at least one battery module and/or the at least one battery cell by means of at least two first monitored variables, as already described by the aforementioned embodiment options, and to control the performance and/or the ageing state of the other battery module and/or the other battery cell in a defined manner by means of at least two second monitored variables, as explained by the embodiment options just described above. In an expedient manner, the second target range is specified for each of the plurality of second monitored variables in such a way that the other battery module and/or the other battery cell satisfy the requirements of the battery with regard to performance and ageing.

At this point, it should be noted that in the case of a plurality of second monitored variables, respectively one second target range is specified for each of the second monitored variables.

In all of the previously described embodiment options of the method steps e and f and particularly of the method steps a to f, it is therefore possible that the at least one first monitored variable and the at least one second monitored variable can be an identical monitored variable. Furthermore, in the case of a plurality of monitored variables that are different from one another, a first monitored variable and a second monitored variable can also be identical monitored variables.

For the case that the at least one first monitored variable and the at least one second monitored variable are identical monitored variables, the first target range and the second target range are preferably identical or the second target range forms a partial amount of the first target range that does not include a peripheral region of the first target range, so that the first value of the at least one first monitored variable of the other battery module selected as a replacement and/or of the other battery cell selected as a replacement does not lie in the peripheral region of the first target range; and thus the danger of the need for a renewed replacement can be decreased. Thus, the other battery modules and/or other battery cells serving as a replacement have a sufficient performance capability and/or have moreover aged in a way that no inhomogeneous distribution of the ageing states occurs within the battery module or respectively the battery.

It is advantageous if the first value of the at least one first monitored variable of another battery module and/or another battery cell is determined in the method step a. Furthermore, a check is made in the method step c whether the first value of the at least one first monitored variable of the other battery module and/or of the other battery cell lies within the first target range for the at least one first monitored variable, said first value being determined in the method step a.

Hence, it can particularly be ensured that the other battery module that replaces a no longer high-performing battery module and/or the other battery cell that replaces a no longer high-performing battery cell satisfy the performance requirements because these can be selected such that the first monitored value thereof lies within the first target range.

Therefore, it particularly can be ensured that the other battery module that replaces a battery module which is too advanced in age and/or the other battery cell that replaces a battery cell which is too advanced in age do not have a too advanced ageing state because these can be selected such that the first monitored variable thereof lies within the first target range.

Thus, the probability can be increased that the first value determined in the method step a lies within the determined first target range particularly by means of the determination of at least one second value of at least one second monitored variable of the other battery module and/or the other battery cell in the method step e and the operation of the other battery module and/or the other battery cell in the method step f in such a way that the second value of the at least one second monitored variable of the other battery module and/or other battery cell lies within a specified second target range. In particular, the second target range is selected in such a way that the battery module equipped for stationary use and/or the battery cell equipped for stationary use is not used or loaded to a greater extent than the battery module or the battery cell of the battery.

It should also particularly be noted at this point that the method steps e and f can only be used as an additional option in order, as was just described, to increase the probability of a successful replacement and are not to be considered mandatory. There is then furthermore also the option to determine and check the at least one first value from a plurality of other battery modules and/or from a plurality of other battery cells as to whether the determined first value lies within the first target range. In this case, the probability is reduced on the one hand of finding a battery module that satisfies the requirements and/or a battery cell that satisfies the requirements as a result of eliminating the method steps e and f. On the other hand, the additional cost and effort are eliminated.

It is expedient if the battery has a plurality of battery modules. The plurality of battery modules also has in each case a plurality of battery cells. It is also furthermore possible that the battery has only one battery module which has a plurality of battery cells. In method step a, respectively one first value of at least one first monitored variable is determined from at least two battery modules and/or from at least two battery cells. Furthermore, respectively one first value of at least one first monitored variable can also be determined for each of the battery modules and/or for each of the battery cells. It is thus possible to monitor the performance and/or the ageing state of a plurality of battery modules and/or battery cells, in particular simultaneously.

According to one aspect of the invention, the first target range is determined particularly in each case for each first monitored variable, the determination occurring preferably in a method step b. In so doing, the first target range is determined by specifying a first deviation from a mean value of at least two determined first values of the at least one first monitored variable of at least two battery modules and/or at least two battery cells. The first target range for the at least one first monitored variable is particularly determined in regular time intervals. The first deviation can preferably be changed over the service life of the battery cells of the battery module. Furthermore, it is particularly preferred to form the mean value from a plurality of respectively determined first values of the at least one first monitored variable from a plurality of battery modules and/or battery cells in order to obtain a meaningful result. Therefore, it can be advantageous to not take into account the largest and/or the smallest value when forming the mean value from a sufficient number of values in order to exclude these first values which possibly originate from defective battery modules and/or battery cells.

In particular, since the performance can decrease to a small extent over the service life—the battery cells should however nevertheless have, for an optimal operating mode, a distribution of the performance, which is homogenous except for a tolerated deviation —, a homogenous performance can be made possible by the specification of a first target range which is based on a mean value. Therefore, individual battery modules and/or individual battery cells that are defective and no longer meet the performance requirements can be detected.

The specification of the deviation determines the extent of the inhomogeneity within the battery. The specification of a small deviation allows on the one hand for a very homogenous distribution of the first values of the at least one first monitored variable to be achieved, but on the other hand the need for replacement increases. The specification of a large deviation has the opposite effect. The specification of a deviation that increases linearly with the service life is then preferred, said deviation passing into a constant value with advancing service life.

According to a further aspect of the invention, the second target range is specified in method step f by the specification of a second deviation from a mean value by at least two determined second values of the at least one second monitored variable of at least two battery modules and/or at least two battery cells of the battery. The second target range is specified in particular at regular time intervals. The second deviation can preferably be changed over the service life of the battery cells of the battery module. Furthermore, it is particularly preferred to form the mean value from a plurality of respectively determined second values of the at least one second monitored variable of a plurality of battery modules and/or battery cells, in order to obtain a meaningful result. Therefore, it can be advantageous not to take into account the largest and/or the smallest value when forming the mean value from a sufficient number of values in order to exclude these values which possibly originate from defective battery modules and/or battery cells. Battery cells age during their service life, whereby the performance of which can decrease. Therefore, it is possible by means of determining the second target range on the basis of values of the battery to operate the other battery module and/or the other battery cell in such a way that these fulfill the performance requirements of the battery and/or have a desired ageing state. In order to achieve an optimal operating mode of a battery, it is advantageous if the battery cells, in particular the battery cells of a battery module, have in an ideal case the same ageing state. By determining the second target range on the basis of values of the at least one second monitored variable of the battery modules and/or the battery cells of the battery, it is possible to operate the other battery module and/or the other battery cell such that these have the same ageing state, just as the at least one battery module and/or the at least one battery cell, which could be replaced by this other battery module and/or the other battery cell. In particular, the second deviation can also be selected in such a way that the other battery module equipped for stationary use or the other battery cell equipped for stationary use are not used or loaded to a greater extent than the at least one battery module or the at least one battery cell. It should thereby be understood that the power output of the other battery module or the other battery cell is less over time than is the case for the at least one battery module or the at least one battery cell.

In addition, the invention relates to a battery which has at least one battery module with at least one battery cell. The battery is equipped to operate with an inventive method described above.

The battery has a first measuring element which is equipped to determine a first value of at least one first monitored variable of the at least one battery module and/or the at least one battery cell in the method step a. Furthermore, the battery can also have a plurality of first measuring elements, which are equipped in each case to determine another first monitored variable.

The battery has a first control unit which is equipped to determine a first target range for the first value of the at least one first monitored variable in particular in the method step b. The control unit is also particularly equipped to form the mean value of a plurality of the determined first values of the at least one first monitored variable and to determine the first target range by specifying a deviation.

The battery has a first evaluation unit which is equipped to check whether the determined first value of the at least one first monitored value lies within the first target range for the at least one first monitored variable.

The battery furthermore has a means, which is equipped to separate the at least one battery module and/or the at least one battery cell in the method step d; thus enabling a defective battery module and/or a defective battery cell to be replaced by another battery module and/or another battery cell.

In addition, it is advantageous if the battery has a second measuring element which is equipped to determine a second value of at least one second monitored variable of the at least one battery module and/or the at least one battery cell.

Furthermore, the battery has a second measuring element which is equipped to determine a second value of at least one second monitored variable of the at least one battery module and/or the at least one battery cell. In addition, the battery can also have a plurality of second measuring elements which are equipped in each case to determine another second monitored variable.

The battery has a second control unit which is equipped to determine a second target range for the second value of the at least one second monitored variable in particular in method step b.

At this point, it should be noted that the dependent claims depict advantageous modifications which can also be combined with one another. In addition, it goes without saying that all advantages and modifications mentioned in connection with the method according to the invention also apply in connection with the battery according to the invention.

The present invention relates particularly to a method for operating a battery having at least one battery module with at least one battery cell. The invention can thus particularly be understood to imply that a battery can have a plurality of battery modules and the inventive method only comprises the monitoring of the battery modules and the replacement of a battery module that does not meet the requirements. Furthermore, the invention can be understood to mean that only the battery cells of a battery module are monitored and battery cells that do not meet the requirements are replaced.

BRIEF DESCRIPTION OF THE DRAWINGS

Exemplary embodiments of the invention are depicted in the drawings and described in detail in the following description.

In the drawings.

DETAILED DESCRIPTION

Figure 1:
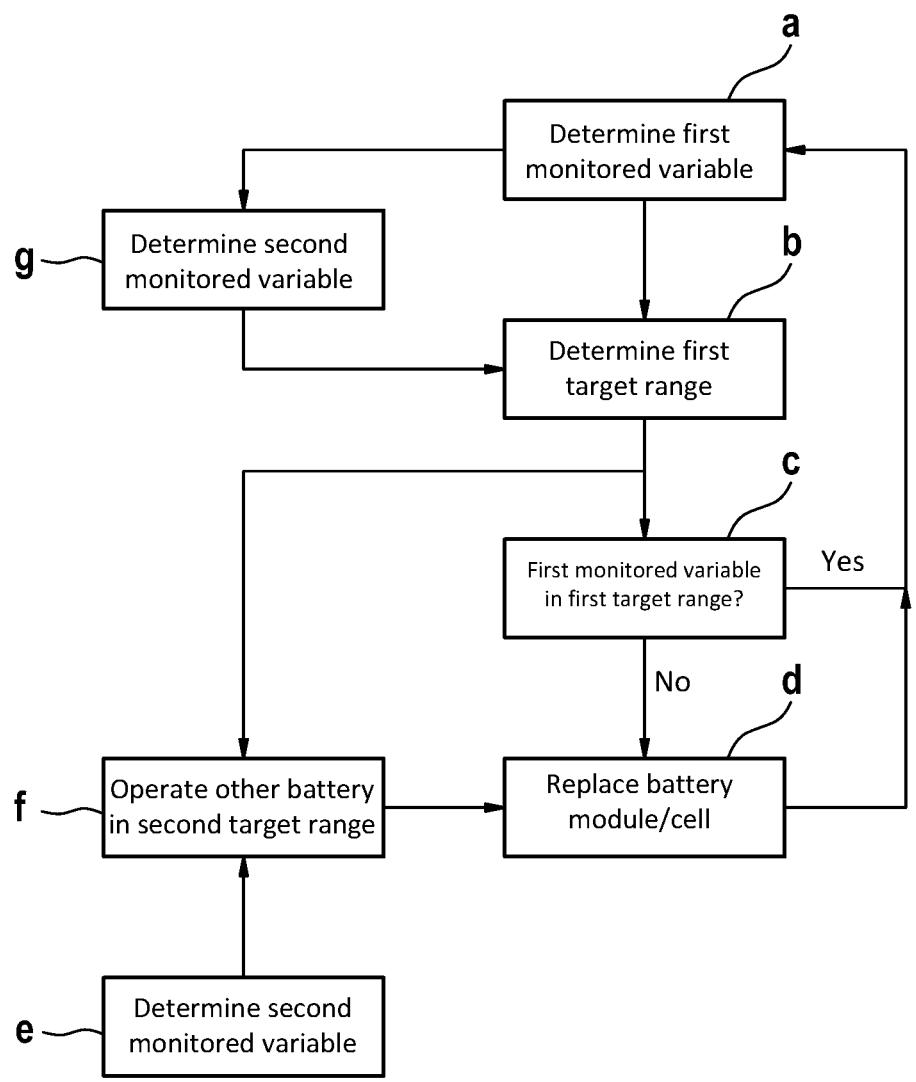
FIG. 1 shows schematically the operating principle of an exemplary embodiment of a method according to the invention and FIG. 2 shows schematically an embodiment of a battery according to the invention.

FIG. 1 shows schematically the operating principle of a method according to the invention for operating a battery, which is to be clarified with the aid of FIG. 1. As can be seen in FIG. 1, the method has the depicted method steps a to g.

The method step a includes determining of a first value of at least one first monitored variable of at least one battery module and/or at least one battery cell of the battery, wherein preferably a first measuring element of the battery determines the first value.

In addition, method step a can also include determining the first value of the at least one first monitored variable for another battery module and/or for another battery cell.

The method step b includes determining a first target range for the first value determined in the method step a, wherein a first control unit of the battery determines the first target range. To this end, the first target range can be calculated as a function of the service life of the battery or also be calculated via a mean value formation that is explained above. In addition, it is however also possible, as already described above, for the first target range to already be determined prior to method step a.

The method step c includes the checking whether the determined first value of the at least one first monitored variable lies within the first target range, which was particularly determined in the method step b, for the at least one first monitored variable. A check is particularly made in method step c whether the determined first value of the other battery module lies within the first target range.

Of course, the method steps b and c can also include determining in each case one first target range and checking for a plurality of battery modules and/or battery cells as well as a plurality of first monitored variables that are different from one another.

The method step d includes replacing the at least one battery module by another battery module and/or replacing the at least one battery cell by another battery cell in the event that the determined first value of the at least one first monitored variable lies outside of the first target range for the at least one first monitored variable.

Thus, the first value of the at least one first monitored variable in the case of the other battery module or the other battery cell lies within the first target range for the at least one first monitored variable.

The method is completed if, in method step d, the at least one battery module has been replaced by another battery module and/or the at least one battery cell has been replaced by another battery cell in the event that the determined first value of the at least one first monitored variable lies outside of the first target range for the at least one first monitored variable or if, in method step c, the determined first value of the at least one first monitored variable lies within the first target range for the at least one monitored variable.

The method can subsequently begin again at method step a so that a constant monitoring of the battery is possible.

As can be seen in FIG. 1, the method can additionally have the method step g in which a second value of at least one second monitored variable of the at least one battery module and/or the at least one battery cell is determined.

In method step b, a second target range for the at least one second monitored variable is specified.

Independently of the already described method steps a to d as well as g, a second value of at least one second monitored variable of another battery module and/or another battery cell is determined in method step e.

The method step f then includes the operation of the other battery module and/or the other battery cell in such a way that the second value of the at least one second monitored variable of the other battery module and/or the other battery cell lies within the second target range determined in method step b.

The other battery modules and/or other battery cells operated in method step f such that the second value of the at least one second monitored variable lies within the specified second target range are used to replace the at least one battery module and/or the at least one battery cell in method step d.

Figure 2:
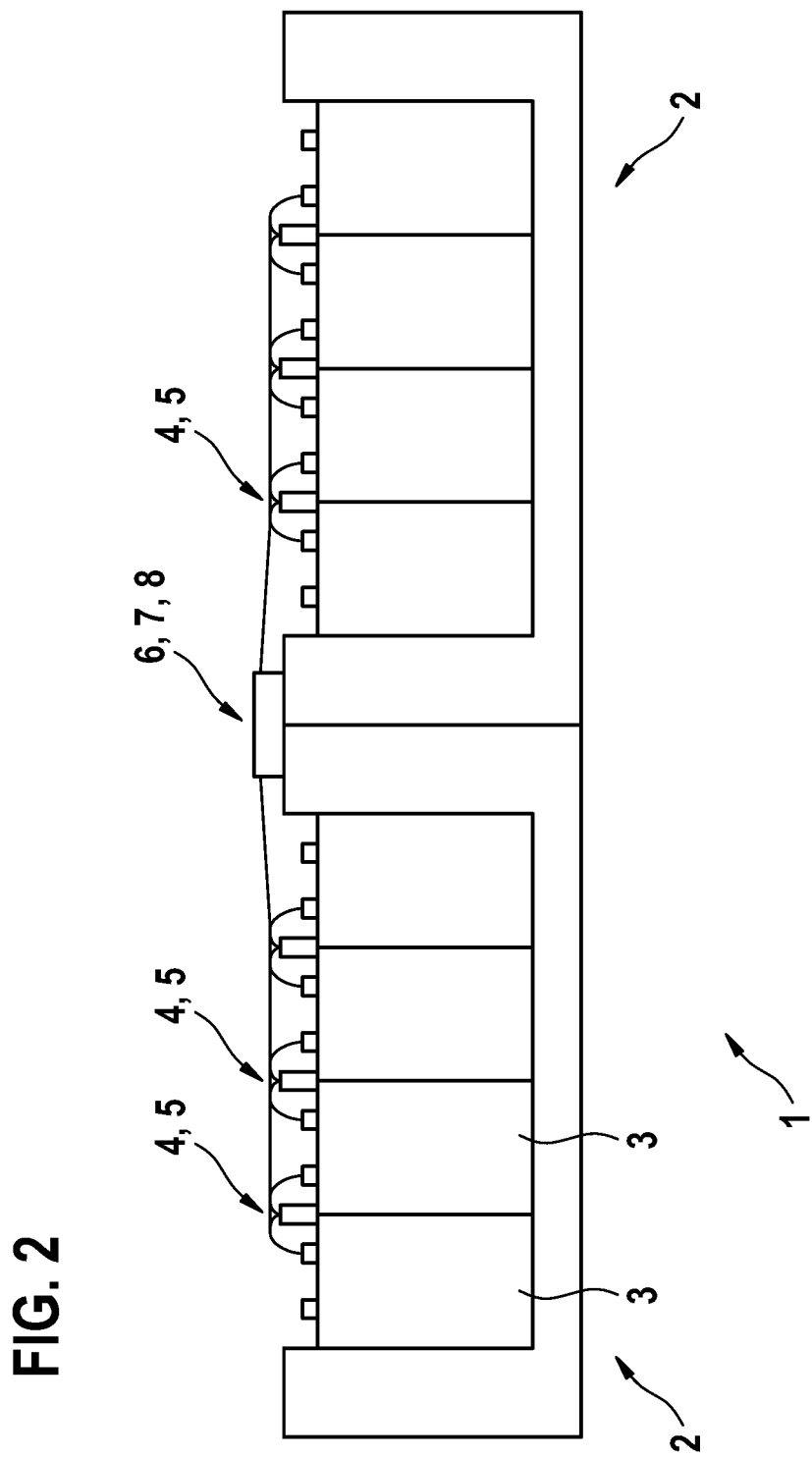

FIG. 2 shows schematically an embodiment of a battery 1 according to the invention.

The battery 1 has at least one battery module 2, wherein in particular the battery shown in FIG. 2 has two battery modules 2.

The battery module 2 has at least one battery cell 3, wherein the battery modules shown in particular in FIG. 2 have in each case four battery cells 3.

Furthermore, the battery 1 has a first measuring element 4 which is equipped to determine the first value of at least one first monitored variable. The first measuring element 4 is arranged in such a way that a determination of the first monitored variable is possible.

Furthermore, the battery 1 has a second measuring element 5 which is equipped to determine the second value of at least a second monitored variable. The second measuring element 5 is arranged in such a way that a determination of the second monitored variable is possible.

Furthermore, the battery 1 has a first control unit 6 which is equipped to determine a first target range for the first value of the at least one first monitored variable. To this end, the first control unit 6 is connected to the first measuring element 4.

Furthermore, the battery 1 has a second control unit 7 which is equipped to determine a second target range for the second value of the at least one second monitored variable. To this end, the second control unit 7 is connected to the second measuring element 5.

In addition, the battery 1 has an evaluation unit 8 which is equipped to check whether the determined first value lies within the first target range.

The invention claimed is:

1. A method for operating a battery having at least one battery module (2) with at least one battery cell (3), the method comprising:
   determining a first value of at least one first monitored variable of the at least one battery module (2) and/or the at least one battery cell (3), the at least one first monitored variable indicative of an aging state and/or performance of the at least one battery module (2) and/or the at least one battery cell (3),
   determining a first target range of the at least one first monitored variable,
   checking whether the determined first value lies within the first target range
   when the determined first value lies outside the first target range, replacing the at least one battery module (3) with a replacement battery module and/or replacing the at least one battery cell (2) with a replacement battery cell, wherein a determined first value of the at least one first monitored variable indicative of an aging state of the replacement battery module or the replacement battery cell lies within the first target range for the at least one first monitored variable;
   determining a second value of at least one second monitored variable of the replacement battery module and/or the replacement battery cell, the at least one second monitored variable indicative of an aging state and/or performance of the replacement battery module and/or the replacement battery cell (3), and
   operating the replacement battery module and/or the replacement battery cell such that the second value is within a specified second target range outside of the first target range, the second target range being selected in such a way that the replacement battery module and/or replacement battery cell is loaded to a lesser extent than the at least one battery module (2) and/or the at least one battery cell (3) of the battery.

2. The method according to claim 1, wherein the at least one first monitored variable is a temperature, an electrical voltage, a discharge current, a volume expansion, a capacity, a charge acceptance, a degree of efficiency or a self-discharge.

3. The method according to claim 1, wherein the method further includes the determining of the first value of the at least one first monitored variable of the replacement battery module and/or the replacement battery cell and the checking whether the determined first value of the at least one first monitored variable of the replacement battery module and/or the replacement battery cell lies within the first target range for the at least one first monitored variable.

4. The method according to claim 1, wherein the battery (1) has a plurality of battery modules (2) which in each case have a plurality of battery cells (3) and the method further includes determining a first value of the at least one first monitored variable for at least two battery modules (2) and/or for at least two battery cells (3).

5. The method according to claim 4, wherein the first target range is determined at regular time intervals by specifying a first deviation from a mean value of at least two determined first values of the at least one monitored variable of at least two battery modules (2) and/or at least two battery cells (3), wherein the first deviation is changed over the service life of the battery cells (3) of the battery module.

6. The method according to claim 1, wherein the second target range is determined at regular time intervals by specifying a second deviation from a mean value of at least two determined second values of the at least one second monitored variable of at least two battery modules (2) and/or at least two battery cells (3), wherein the second deviation is changed over the service life of the battery cell (3) of the battery module (2).

7. The method according to claim 1, wherein the at least one second monitored variable is different from the at least one first monitored variable.

8. The method according to claim 1, wherein a power output of the other battery module or the other battery cell over the time is less than a power output of the at least one battery module or the at least one battery cell.

* * * * *